United States Patent
Hess (10) Patent No.: US 7,930,097 B2
(45) Date of Patent: Apr. 19, 2011

(54) METHOD AND APPARATUS FOR DISPLAYING TERRAIN ELEVATION INFORMATION

(75) Inventor: Michael Dean Hess, Castle Rock, CO (US)

(73) Assignee: The Boeing Company, Chicago, IL (US)

( * ) Notice: Subject to any disclaimer, the term of this patent is extended or adjusted under 35 U.S.C. 154(b) by 945 days.

(21) Appl. No.: 11/778,277

(22) Filed: Jul. 16, 2007

(65) Prior Publication Data

US 2009/0024311 A1    Jan. 22, 2009

(51) Int. Cl.
*G01S 7/06* (2006.01)

(52) U.S. Cl. .............. 701/200; 701/4; 701/14; 701/208; 701/211

(58) Field of Classification Search ................ 701/3, 4, 701/9, 10, 14, 15, 16, 200, 208, 211, 213; 342/26 B, 179, 191; 340/945, 953, 961
See application file for complete search history.

(56) References Cited

U.S. PATENT DOCUMENTS

| | | | |
|---|---|---|---|
| 6,995,690 B1 * | 2/2006 | Chen et al. ............... | 340/974 |
| 7,209,070 B2 * | 4/2007 | Gilliland et al. .......... | 342/26 B |
| 2002/0113719 A1 | 8/2002 | Muller et al. | |
| 2006/0077092 A1 | 4/2006 | Gilliland et al. | |

FOREIGN PATENT DOCUMENTS

WO    9807047 A    2/1998

* cited by examiner

*Primary Examiner* — Richard M. Camby
(74) *Attorney, Agent, or Firm* — Yee & Associates, P.C.; Dennis R. Plank (57) ABSTRACT

A method, apparatus, and computer usable program code for presenting terrain elevation information on a vehicle display. In one advantageous embodiment, a swath representing an area ahead of the vehicle is identified, wherein the swath has a length and a width. A two dimensional elevation view is presented on the vehicle display, wherein a vertical axis of the two dimensional elevation view represents a highest elevation along a width of a swath for a particular point along the length of the swath. The width of the swath is updated in response to vehicle movement to form an updated swath width. The two dimensional elevation view is updated using the updated swath width.

17 Claims, 9 Drawing Sheets

METHOD AND APPARATUS FOR DISPLAYING TERRAIN ELEVATION INFORMATION

BACKGROUND INFORMATION

1. Field

The present disclosure relates generally to an improved data processing system for use with an aircraft and in particular to a method and apparatus for displaying information relating to an aircraft. Still more particularly, the present disclosure relates to a computer implemented method, apparatus, and computer usable program code for displaying terrain information for an aircraft.

2. Background

Controlled flight into terrain is an accident where an airworthy aircraft under the control of the pilot inadvertently flies into terrain, an obstacle, or water. In these types of accidents, the pilots are generally unaware of the danger until it is too late to avoid the terrain. Pilots with any level of experience, even highly experienced professionals, may be involved in these types of accidents in which a controlled flight into terrain occurs.

Factors that may cause these types of accidents include, for example, pilot fatigue. Further, many accidents often involve impact with significantly raised terrain such as hills or mountains. Other times, cloudy, foggy, or other reduced visibility conditions may cause this type of accident.

A controlled flight into terrain also may occur due to equipment malfunction. For example, if a malfunction occurs in navigation equipment, the navigation equipment may mislead the crew into guiding the aircraft into the terrain despite other information received from properly functioning equipment.

After studies of these types of accidents, terrain warning and display systems have been implemented in aircrafts to enhance flight safety. By providing displays of terrain, improved situational awareness and reduced pilot workload occurs, allowing the pilot and other flight crew to focus on flying the aircraft. The information about the terrain includes elevation information about the terrain. The information is referred to as terrain elevation information.

Typical systems employed in aircrafts graphically display terrain on panel displays that depict elevations surrounding the aircraft position. In other words, the currently available displays show the terrain surrounding the aircraft. With these types of systems, pilots and flight crew have improved situational awareness of the terrain around the aircraft.

SUMMARY

The different advantageous embodiments provide a method, apparatus, and computer usable program code for presenting terrain elevation information on a vehicle display. In one advantageous embodiment, a swath representing an area ahead of the vehicle is identified, wherein the swath has a length and a width. A two dimensional elevation view is presented on the vehicle display, wherein a vertical axis of the two dimensional elevation view represents a highest elevation along a width of a swath for a particular point along the length of the swath. The width of the swath is updated in response to vehicle movement to form an updated swath width. The two dimensional elevation view is updated using the updated swath width.

In another embodiment, a computer program product comprises a computer usable medium having computer usable program code for presenting terrain elevation information. The computer program product includes computer usable program code for identifying a swath representing an area ahead of the vehicle, wherein the swath has a length and a width. Computer usable program code is present for presenting a two dimensional elevation view on the vehicle display, wherein a vertical axis of the two dimensional elevation view represents a highest elevation along a width of a swath for a particular point along the length of the swath. Computer usable program code also is present for updating the width of swath in response to vehicle movement to form an updated swath width. The computer program product also has computer usable program code for updating the two dimensional elevation view using the updated swath width.

In yet another advantageous embodiment, an apparatus comprises a bus; a communications unit connected to the bus; a storage device connected to the bus, wherein the storage device includes computer usable program code; and a processor unit connected to the bus. The processor unit executes the computer usable program to identify a swath representing an area ahead of a vehicle, wherein the swath has a length and a width; present a two dimensional elevation view on a vehicle display, wherein a vertical axis of the two dimensional elevation view represents a highest elevation along a width of a swath for a particular point along the length of the swath; update the width of the swath in response to vehicle movement to form an updated swath width; and update the two dimensional elevation view using the updated swath width.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

DETAILED DESCRIPTION

Figure 1:
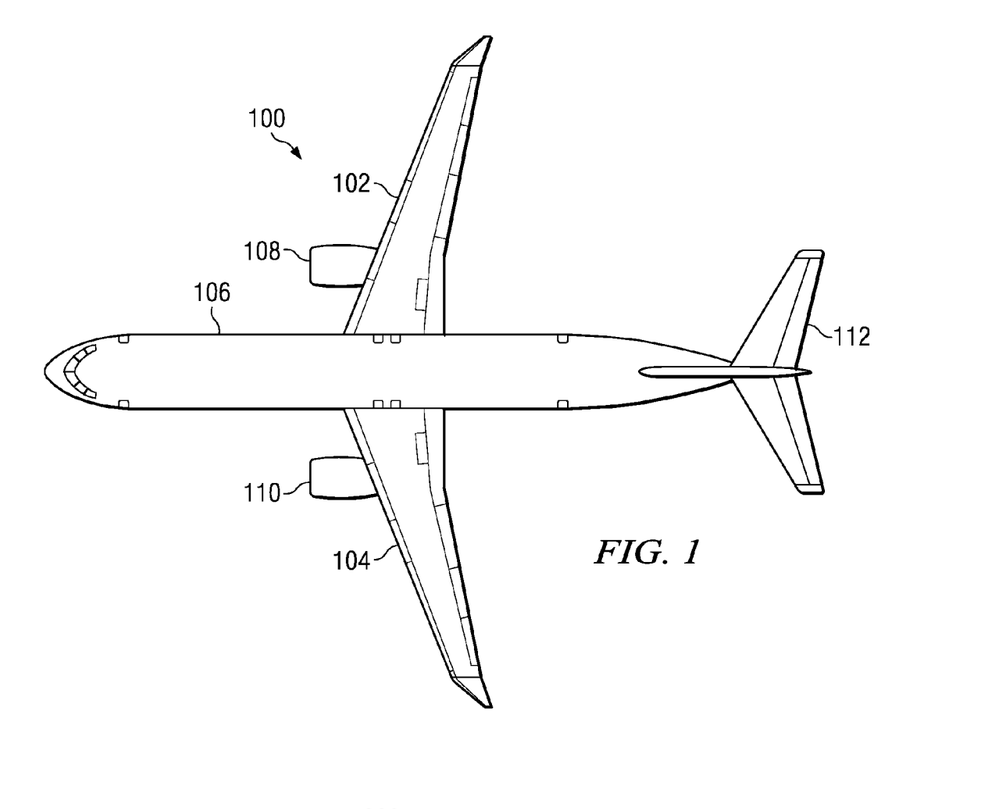
FIG. 1 is a diagram of an aircraft in which an advantageous embodiment may be implemented.

With reference now to the figures, and in particular with reference to FIG. 1, a diagram of an aircraft is depicted in which an advantageous embodiment may be implemented. Aircraft 100 is an example of an aircraft in which a method and apparatus for displaying terrain information may be implemented. In this illustrative example, aircraft 100 has wings 102 and 104 attached to body 106. Aircraft 100 includes wing mounted engine 108, wing mounted engine 110, and tail 112.

The different advantageous embodiments recognize that currently, a profile view of terrain is shown in which data for the terrain is for the terrain under the route. This profile view is a two dimensional display that provides an identification of the height of terrain relative to the route on which the aircraft is traveling or plans to travel.

This type of situational awareness is useful and provides for improved safety in flying aircrafts. The different embodiments also recognize that this type of terrain profile information is currently limited to the route. In some cases, when the aircraft is not directly on the route, the view of the terrain does not accurately show what is currently under the aircraft or in front of the aircraft. As a result, this type of information is not as useful when the aircraft deviates from the planned route.

The advantageous embodiments recognize that providing additional information to pilots flying aircrafts would be desirable to increase the safety already provided by currently available terrain navigation and display systems. Thus, the advantageous embodiments provide a computer implemented method, apparatus, and computer usable program code for increasing the information about terrain display to a user when using a profile view of the terrain. This profile view provided by different advantageous embodiment is also referred to as a terrain elevation view.

The different advantageous embodiments include an ability to show terrain relative to the aircraft position in a two dimensional profile view of the terrain even when the aircraft is not exactly on the planned route. In these examples, a floating terrain is employed such that the terrain being depicted is more relevant to the pilot. Further, this type of display provides a presentation of the actual area of terrain displayed in the profile view relative to the aircraft position. This presentation of the terrain in a terrain elevation view presents each height in this view as the highest point for a width of terrain at the selected distance from the aircraft.

Figure 2:
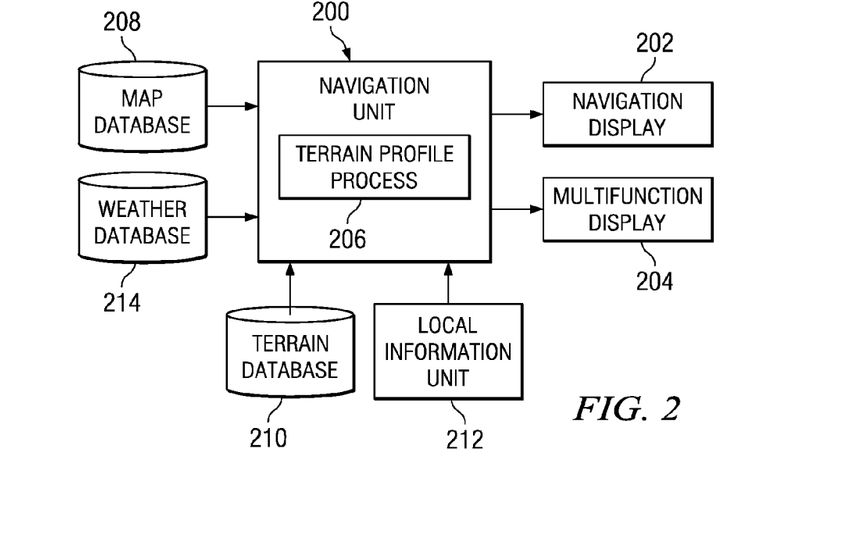
FIG. 2 is a diagram illustrating components used to provide a display of terrain in accordance with an advantageous embodiment.

Turning now to FIG. 2, a diagram illustrating components used to provide a display of terrain is depicted in accordance with an advantageous embodiment. The different components illustrated in FIG. 2 may be implemented in an aircraft, such as aircraft 100 in FIG. 1.

In this example, navigation unit 200 provides a presentation of maps, terrain displays, and other navigation information through navigation display 202 and multifunction display 204. In these examples, navigation display 202 may display information, such as altitude, air speed, vertical speed, and other measurements pertaining to the flight. Multifunction display 204 may present information to a pilot in numerous configurable ways. For example, multifunction display 204 may provide a display of terrain in accordance with an advantageous embodiment. In particular, multifunction display 204 may present a two dimensional terrain elevation view generated according to the advantageous embodiments.

In the illustrative examples, terrain profile process 206 provides a terrain elevation profile display. This display may include a terrain elevation view as well as a thumbnail view of the aircraft as it travels from one point to another point.

Terrain profile process 206 may obtain maps of the areas over which the aircraft flies from map database 208. An identification of terrain for those particular areas may be found in terrain database 210.

Map database 208 may be a local database within the aircraft on which navigation unit 200 is located. Alternatively, map database 208 may be a remote database accessed by navigation unit 200 through a communications link, such as a wireless communications link. In a similar fashion, terrain database 210 may be found locally within the aircraft or may be a remote database accessed by navigation unit 200.

In the different illustrative examples, thumbnail view and terrain elevation view information may be displayed by terrain profile process 206 in navigation unit 200. In these examples, this information may be displayed in multifunction display 204.

The location of the aircraft relative to the map may be identified using location information unit 212. Location information unit 212 may take different forms depending on the particular implementation. For example, location information unit 212 may be a global positioning system unit that provides global positioning system data to terrain profile process 206 within navigation unit 200. Alternatively, location information unit 212 may be an inertial guidance system on the aircraft. Of course, other types of location information units may be implemented depending on the particular embodiment.

Weather database 214 is used to provide weather information that may be included by terrain profile process 206 when displaying a terrain elevation view on multifunction display 204. Weather database 214 may be one or more databases or services that provide weather information. The weather information may include both current weather information as well as weather forecasts. This information may describe weather conditions, such as cloud base or coverage and wind speed and direction.

Although terrain profile process 206 is implemented in a navigation unit with different displays, the different processes used in the advantageous embodiments may be implemented in other components. In other embodiments, these processes may be implemented in a computer or other data processing system in a flight bag, which is a portable system that may be carried by a pilot or other flight crew from aircraft to aircraft.

Figure 3:
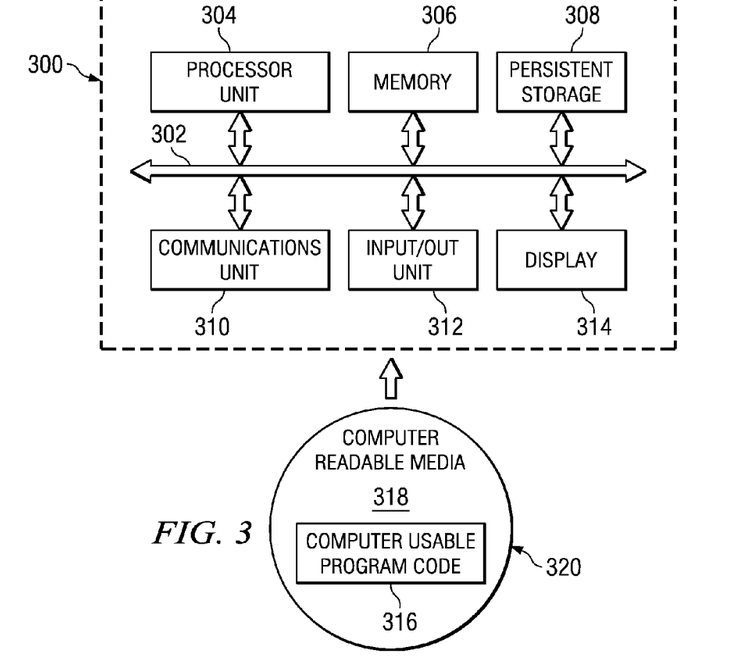
FIG. 3 is a diagram of a data processing system in accordance with an advantageous embodiment.

Turning now to FIG. 3, a diagram of a data processing system is depicted in accordance with an advantageous embodiment. In this particular example, data processing system 300 is an example of a data processing system that may be used to implement a component, such as navigation unit 200 in FIG. 2. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multiprocessor system containing multiple processors of the same type.

Memory 306, in these examples, may be, for example, a random access memory. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as computer usable program code or computer readable program code that may be read and executed by a processor in processor unit 304.

The computer readable program code may be embodied on different physical or tangible computer readable media, such as memory 306 or persistent storage 308.

Computer usable program code 316 is located in a functional form on computer readable media 318 and may be loaded onto or transferred to data processing system 300. Computer usable program code 316 and computer readable media 318 form a computer program product 320 in these examples. In one example, computer readable media 318 may be, for example, an optical or magnetic disc that is inserted or placed into a drive or other device to that is part of persistent storage 308 for transfer onto a storage device, such as a hard drive that is part of persistent storage 308. Computer readable media 318 also may take the form of a persistent storage, such as a hard drive or a flash memory that is connected to data processing system 300.

Alternatively, computer usable program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also make take the form of non-tangible media, such as communications links or wireless transmission containing the computer readable program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

For example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Figure 4:
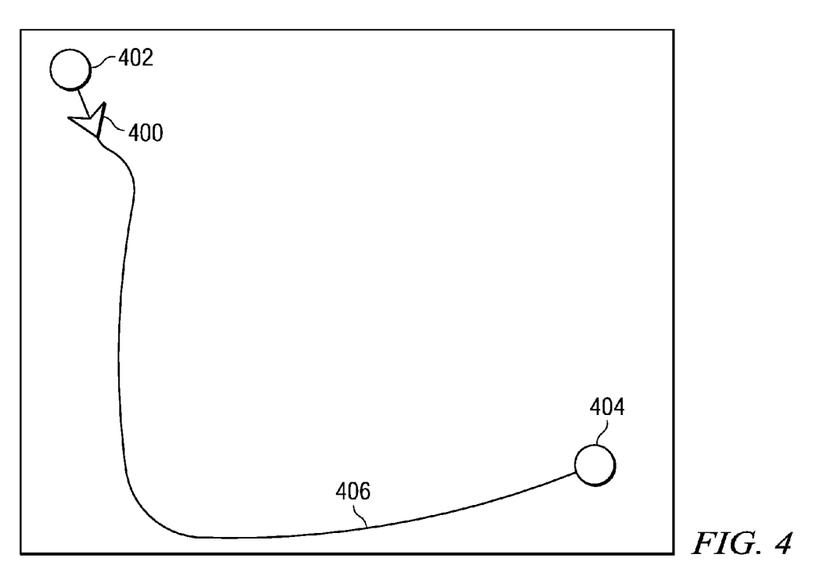
FIG. 4 is a diagram illustrating a route of an aircraft in accordance with an advantageous embodiment.

With reference next to FIG. 4, a diagram illustrating a route of an aircraft is depicted in accordance with an advantageous embodiment. In this example, aircraft 400 may take off from origination point 402 and fly to destination point 404 along route 406. Route 406 is a planned route in these examples. Origination point 402 may be a point of departure from an airport. Alternatively, origination point 402 may be some other point selected by the pilot or aircraft crew during flight. In a similar fashion, destination point 404 may be a point of arrival at another airport or some other point along the route selected by a pilot or aircraft crew.

In this example, route 406 is not a straight line between origination point 402 and destination point 404. The two dimensional terrain elevation profile view of the terrain provided in these examples may be for terrain along route 406 even though the profile view is depicted along a single axis in the two dimensional view. Examples of the different types of displays that may be presented through multifunction display 204 in FIG. 2 are illustrated in FIGS. 4 and 5.

Figure 5:
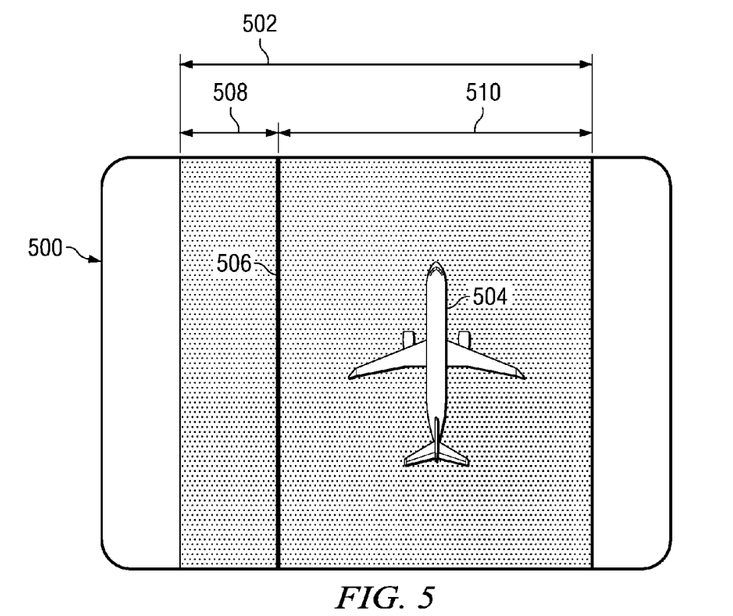
FIG. 5 is a diagram of a thumbnail view in accordance with an advantageous embodiment.

With reference now to FIG. 5, a diagram of a thumbnail view is depicted in accordance with an advantageous embodiment. Thumbnail view 500 provides a top down view of an aircraft. Thumbnail view 500 illustrates terrain elevation width 502. As depicted, thumbnail view 500 presents aircraft 504 relative to route 506 in a two dimensional top down view. In these examples, terrain elevation width 502 is used to identify the width of an area from which terrain profile or elevation information is selected. In these advantageous embodiments, the highest elevation for terrain along a line within terrain elevation width 502 is used as the data point for the two dimensional terrain elevation view at that point along the route.

In these examples, terrain elevation width 502 is variable depending on the position of aircraft 504 relative to route 506. In these illustrative examples, the minimum width of either side of route 506 is 0.5 nautical miles. As a result, if aircraft 504 is on route 506, the terrain elevation width is 1.0 nautical miles with 0.5 nautical miles on each side of route 506. In this example, aircraft 504 is shown as having deviated from route 506. The width of section 508 is at the minimum of 0.5 nautical miles in these examples. Of course, other default minimums may be used other than 0.5 nautical miles, depending on the particular embodiment or implementation.

The width of section 510 is identified or calculated as the delta or difference between the position of aircraft 504 relative to route 506 plus 0.5 nautical miles. In this example, aircraft 504 is 3.5 nautical miles from route 506. As a result, the width of section 510 is 4.0 nautical miles. Thus, terrain elevation width 502 is 4.5 nautical miles in these examples. Although a minimum of 0.5 nautical miles is used in this particular example, other distances or widths may be used depending on the particular implementation.

In this manner, as the position of aircraft 504 changes relative to route 506, terrain elevation width 502 may change in size. This terrain width elevation also is referred to as a swath width. Thumbnail view 500 is used to identify the swath of aircraft 504. A swath is the area in front of the vehicle having a length and a width in these examples. Thus, the width of the swath is terrain elevation width 502 in these examples. The distance ahead of aircraft 504 for the swath depends on the particular implementation. The distance ahead of aircraft 504 for the swath is referred to as the swath length. The swath length may be, for example, the point of arrival. In this case, the swath length is the point of arrival. In other words, a swath length is the distance to the point of arrival when a route is present in these examples. The length may not be a straight line if the route is not a straight line since the swath in these examples follows the route of the aircraft.

When a route is absent or the aircraft has deviated farther than some threshold distance from the planned route, the swath length is selected or bounded in these examples. In the depicted examples, the swath length may be set to some preselected or configurable length based on distance or time. For example, the length may be set to a fixed ahead of the aircraft, such as fifty nautical miles, one hundred nautical miles, or one hundred-fifty nautical miles.

Alternatively, the swath length may be set to some flight time ahead of the aircraft, such as twelve minutes, fifteen minutes, or eighteen minutes. In this case, the swath length is based on the airspeed of the aircraft. When using aircraft speed to determine the length of the swath, the swath length may increase as the aircraft speed increases. The illustrative values represent a maximum value and may allow the pilot to zoom into a view with some value smaller than the setting.

Additionally, the display of aircraft 504 in thumbnail view 500 is an optional display. In some implementations, aircraft 504 is not displayed within thumbnail view 500.

Figure 6:
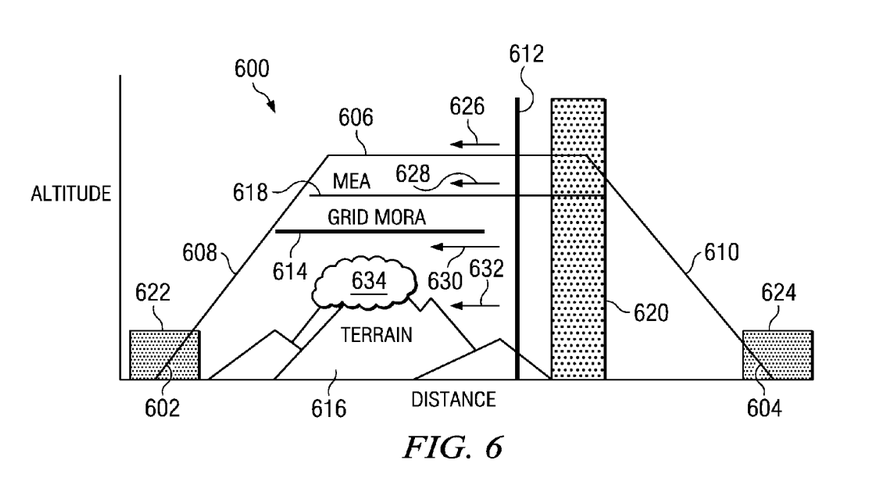
FIG. 6 is a diagram illustrating a terrain elevation view in accordance with an advantageous embodiment.

Turning now to FIG. 6, a diagram illustrating a terrain elevation view is depicted in accordance with an advantageous embodiment. In this example, terrain elevation view 600 is an example of a display that may be presented on multifunction display 204 in FIG. 2. In these examples, terrain elevation view 600 may be presented in conjunction with thumbnail view 500 in FIG. 5.

In this example, the X-axis represents distance while the Y-axis represents the altitude. This Y-axis is a vertical axis of the two dimensional elevation view and represents a highest elevation along a width of a swath for a particular point along the length of the swath. In other words, for any point along the length of the swath, a width is present for the swath. This width is a terrain elevation width, such as terrain elevation width 502 in FIG. 5. The highest elevation along that width is used as the value for display in terrain elevation view 600 for the point along the length of the swath.

Terrain elevation view 600, in this example, provides an identification of point of departure (POD) 602 and point of arrival (POA) 604. The planned en route altitude is found in elevation route 606. In this example, elevation route 606 represents the different elevations at which the aircraft flies. This route includes a climb phase at segment 608 and a descent phase at segment 610 for the aircraft.

The current location of the aircraft along elevation route 606 is identified using aircraft position indicator 612. In this example, grid mora 614 represents a minimal obstacle clearance for terrain 616. In other words, grid mora 614 represents the minimum altitude that the aircraft should fly over terrain 616 along the line for grid mora 614. Minimum en route altitude 618 represents the minimum altitude that the aircraft should fly in route.

Terrain elevation view 600 also provides an identification of different types of airspace. Section 620 represents a special use airspace. For example, this may be restricted airspace based on approach to airport or some other area. Section 622 and section 624 represent airspace for terminals at point of departure 602 and point of arrival 604.

As can be seen in this example, terrain 616 has different elevations along elevation route 606. The different heights for terrain 616 represent the maximum height of terrain 616 within the terrain elevation width or swath width at that selected distance on elevation route 606. In other words, the altitude represented for different portions of terrain 616 may not be for the terrain directly under the route of the aircraft or directly under the aircraft. Instead, the height shown is the maximum height of any terrain along a particular point in the route and to the left or right of elevation route 606 for a width identified based on the terrain elevation width as illustrated in thumbnail view 500 depicted in FIG. 5.

Elevation route 606 may be a route similar to route 406 displayed in FIG. 4. In other words, route 606 provides planned elevations for an aircraft traveling along a route, such as route 406 in FIG. 4.

Other information also may be provided depending on the particular implementation. In these examples, terrain elevation view 600 may be used to display weather information along elevation route 606. For example, cloud base information and mountain top cloud obscuration may be presented. Further, information, such as enroute winds aloft with head wind or tail wind components may be illustrated.

For example, wind indicators 626, 628, 630 and 632 may used to show a head wind component of decreasing strength with decreasing altitude as shown by the different lengths of these indicators. Additionally, cloud cover also may be identified as shown by graphical indicator 634. In this example, graphical indicator 634 shows that mountain tops within terrain 616 are obscured by cloud cover.

In this manner, the display of weather information on terrain elevation view 600 may be used to provide a pilot or aircraft crew alerts as to possible danger areas. Further, display of this information when a divergence from a planned route due to weather may be valuable to the pilot and aircraft crew.

Figure 7:
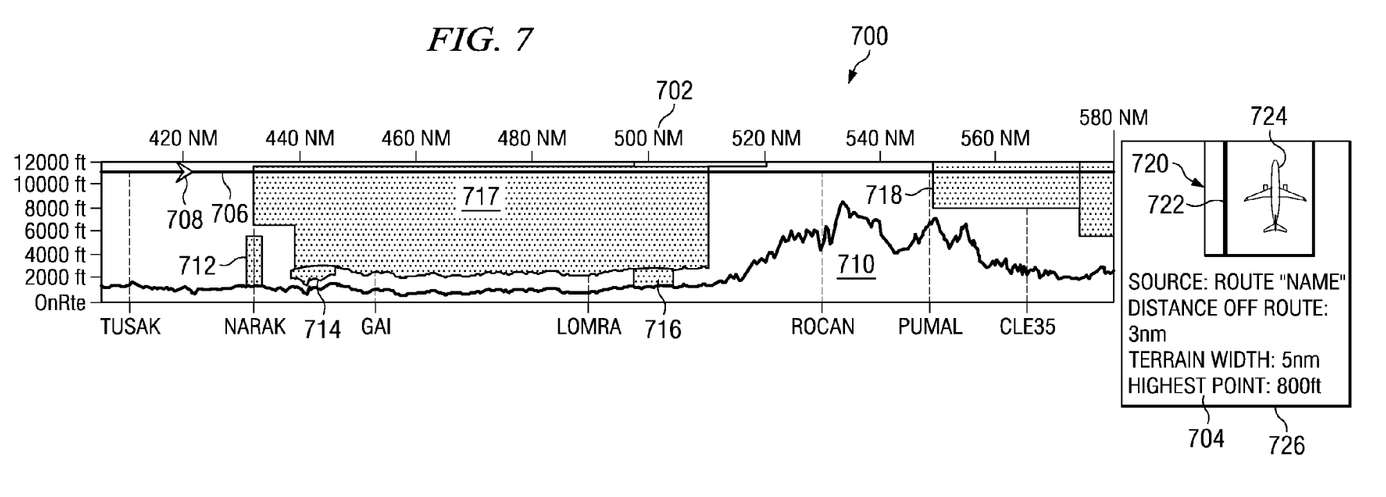
FIG. 7 is an illustration of a terrain elevation profile display containing a terrain elevation view and a thumbnail view in accordance with an advantageous embodiment.

Turning now to FIG. 7, an illustration of a terrain elevation profile display containing a terrain elevation view and a thumbnail view is depicted in accordance with an advantageous embodiment. In this example, display 700 is an example of a terrain elevation view display that may be presented in multifunction display 204 in FIG. 2. Display 700 includes terrain elevation view 702 and thumbnail view 704.

The X-axis in terrain elevation view 702 is the distance in nautical miles, while the Y-axis represents the height in feet. In this example, terrain elevation view 702 includes a presentation of elevation route 706 with an identification of aircraft 708 along elevation route 706. Aircraft 708 is displayed in its current position. The current position includes the height of the aircraft and the location of the aircraft relative to the route or terrains. In these examples, two dimensional terrain elevations are found in terrain elevation 710.

Further, different classes of airspace are illustrated in this particular example. Sections 712, 714, and 716, in these examples, represent restricted airspace, while sections 717 and 718 represent a regulated airspace in these examples. The other sections represent unregulated airspace in these particular examples. The height of terrain elevation 710 along elevation route 706 represents a highest point of terrain for a terrain width or swath width at that point.

In this example, thumbnail view 704 includes an identification of this width at swath width 720. Thumbnail view 704 also includes a presentation of route 722 as well as a display of aircraft 724 in its relative position to route 722. Further, information section 726 in thumbnail view 704 also provides additional information to the pilot and/or aircraft crew. The route name is provided as well as the distance off route 722.

In this illustrative example, aircraft 724 is three nautical miles off route 722. The delta or distance from route 722 is measured as a perpendicular distance from a point at route 722 to the location of aircraft 724. Further, thumbnail view 704 also identifies the terrain width as being five nautical miles. Information section 726 also includes an identification of the highest point within the swath identified for aircraft 724 in this example.

In the depicted examples, color coding may be used to present information in the displays. For example, different types of airspace may be displayed using different colors.

In these illustrative embodiments, if the aircraft wanders too far off the planned route, the terrain swath is set to some preselected or configurable width centered on the aircraft's current track, and the terrain swath length is set to some preselected or configurable fixed distance or time ahead of the aircraft. This type of setting also may occur if no planned route is available.

Figure 8:
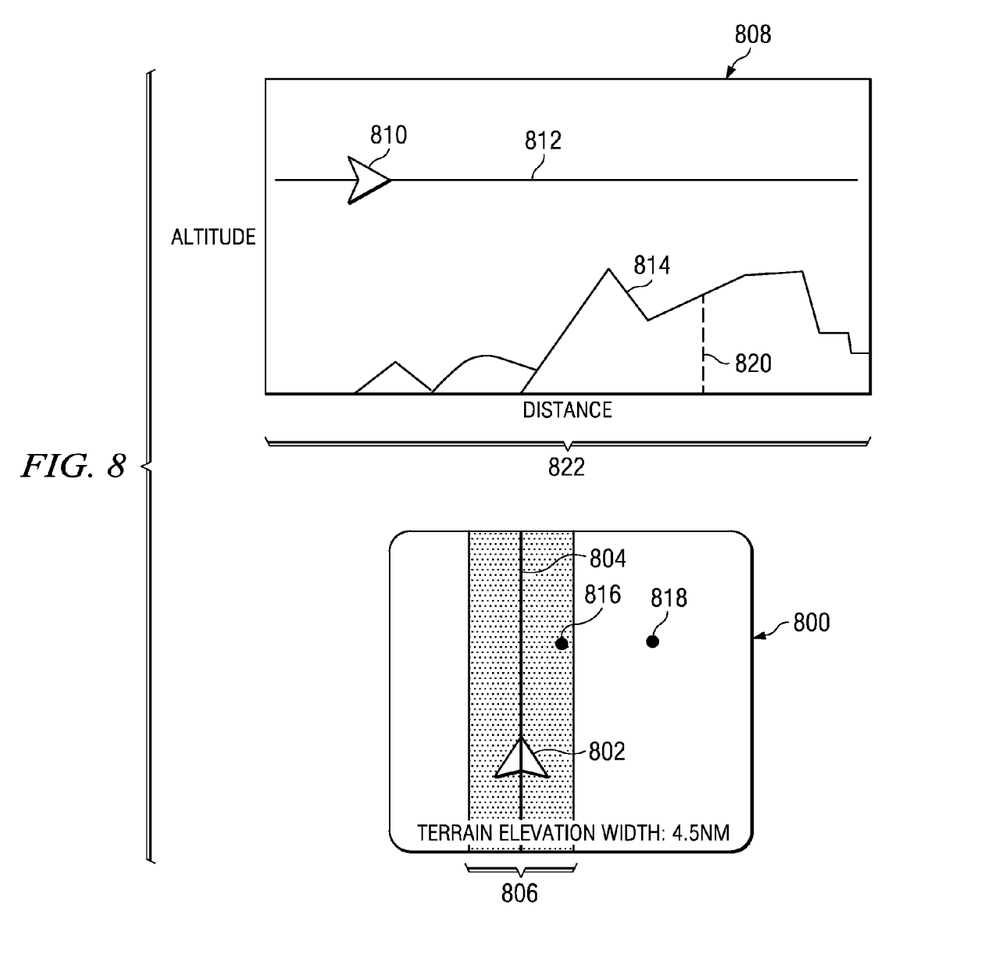
FIG. 8 is a diagram illustrating a terrain elevation view and a thumbnail view in accordance with an advantageous embodiment.

Turning now to FIG. 8, a diagram illustrating a terrain elevation view and a thumbnail view is depicted in accordance with an advantageous embodiment. In this example, thumbnail view 800 indicates that aircraft 802 is flying on route 804 without any deviation from this route. As a result, terrain elevation width 806 is one nautical mile with one-half nautical mile being present on either side of route 804.

Terrain elevation view 808 presents a display of aircraft 810 along elevation route 812. Aircraft 810 is displayed at a point along elevation route 812 to indicate its position in terrain elevation view 808. In this example, elevation route 812 shows the planned in route altitude. Additionally, terrain elevation view 808 also provides a display of terrain height in vertical profile 814 along elevation route 812.

In these examples, route 804 corresponds to elevation route 812. Route 804 provides a top down view of the route, while elevation route 812 provides identification of the vertical profile of the highest points within terrain elevation width 806. As depicted, point 816 and point 818 are the same distance ahead of aircraft 802. Point 816 has lower height or elevation than point 818.

In this depicted example, point 816 is the highest height at that particular point along route 804. This height is represented by the height of line 820 in these examples. A higher height is not shown with respect to point 818 even though point 818 is higher than point 816 because terrain elevation width 806 does not encompass point 818.

In this illustrative example, swath length 822 is a maximum terrain swath length that may be determined using a number of different factors. For example, if aircraft 810 is located along a planned route with a point of arrival, swath length 822 may be the distance from the point of departure to the point of arrival or some selected distance from the point of arrival. Alternatively, if aircraft 810 is off a planned route by some distance greater than a threshold or no planned route is present, then swath length 822 may be some preselected distance or time ahead of aircraft 810. If the time ahead of aircraft 810 is used to determine swath length 822, swath length 822 may vary as the speed of aircraft 810 varies.

Figure 9:
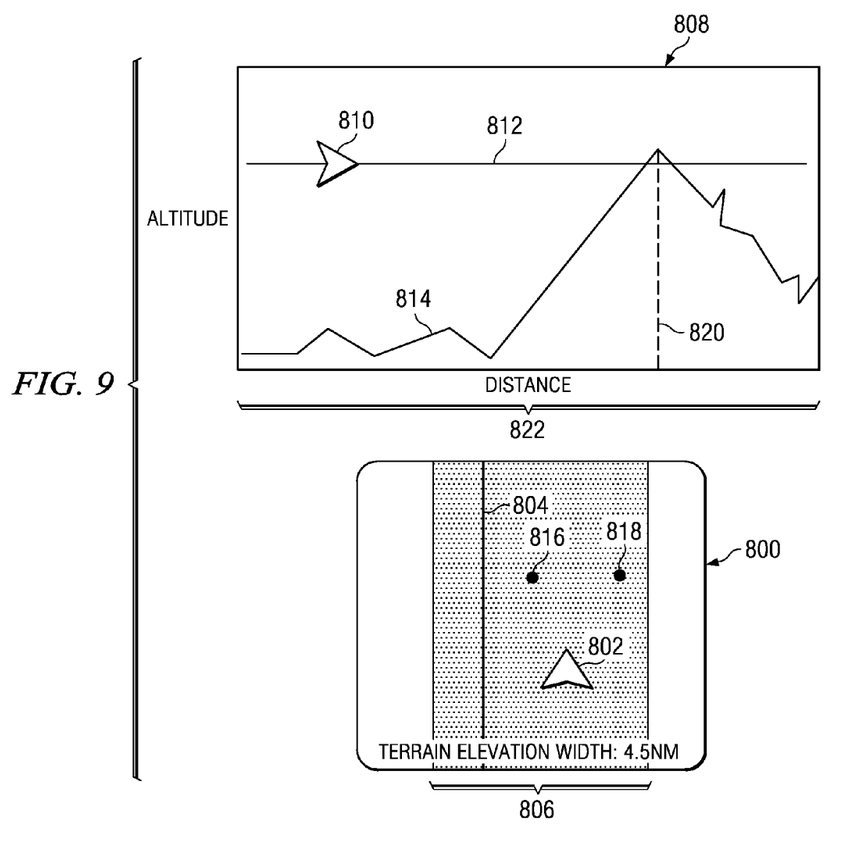
FIG. 9 is a diagram illustrating a change in a thumbnail view and terrain elevation view in response to a deviation from a route in accordance with an advantageous embodiment.

Turning now to FIG. 9, a diagram illustrating a change in a thumbnail view and terrain elevation view in response to a deviation from a route is depicted in accordance with an advantageous embodiment. In this example, aircraft 802 has deviated from route 804 as illustrated in thumbnail view 800. This deviation results in a change in terrain elevation width 806 from a one nautical mile terrain width to a 4.5 nautical mile terrain width in these examples. Consequently, this change in terrain elevation width 806 now encompasses point 818. Moreover, this change results in terrain elevation view 814 also changing.

As can be seen, line 820 now extends higher than as illustrated in FIG. 8 because now the same point in route 804 has a higher height. As illustrated, line 820 now intersects elevation route 812 indicating that a danger is present of a controlled terrain collision occurring. Line 820 is adjusted to show the height at point 818 instead of point 816 because point 818 is higher than point 816.

As a result, as terrain elevation width 806 changes based on deviations of aircraft 802 from route 804. Terrain elevation view 814 also changes to indicate the highest points within the terrain width along the route of aircraft 802.

Figure 10:
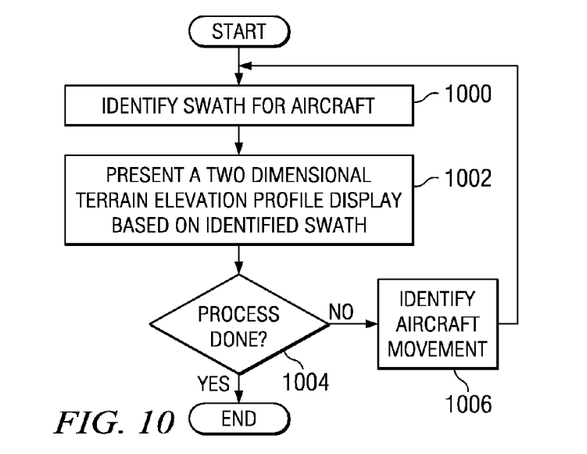
FIG. 10 is a flowchart of a process for displaying terrain profile information in accordance with an advantageous embodiment.

Turning now to FIG. 10, a flowchart of a process for displaying terrain profile information is depicted in accordance with an advantageous embodiment. The process illustrated in FIG. 10 may be implemented in a terrain profile process, such as terrain profile process 206 in FIG. 2.

The process beings identifying a swath for the aircraft (operation 1000). In these examples, a swath has a width and a length. The width of the swath is a distance along a line that is perpendicular to the route of the aircraft at the particular point of interest. The length of the swath may vary depending on the particular implementation. The length may be a set distance or may be a distance all the way to the arrival point for the aircraft.

Next, a two dimensional terrain elevation profile display is presented based on the identified swath (operation 1002). This two dimensional terrain elevation profile display may include both a terrain elevation view and a thumbnail view such as those depicted in FIGS. 6-9. Alternatively, just a terrain elevation view may be presented depending on the particular implementation. A determination is made as to whether the process is done (operation 1004). The process may be done or completed if the aircraft lands at the arrival point. Further, the process also may be done if the aircraft deviates too far from the route in these examples. If the process is done, the process terminates.

Otherwise, the process identifies the aircraft movement that has occurred (operation 1006). The process then returns to operation 1000 to identify a swath for the aircraft. The swath may be the same swath if the aircraft has not deviated relative to the route. If the aircraft has deviated relative to the route, then the swath identified in operation 1000 changes in response to the aircraft movement.

Figure 11:
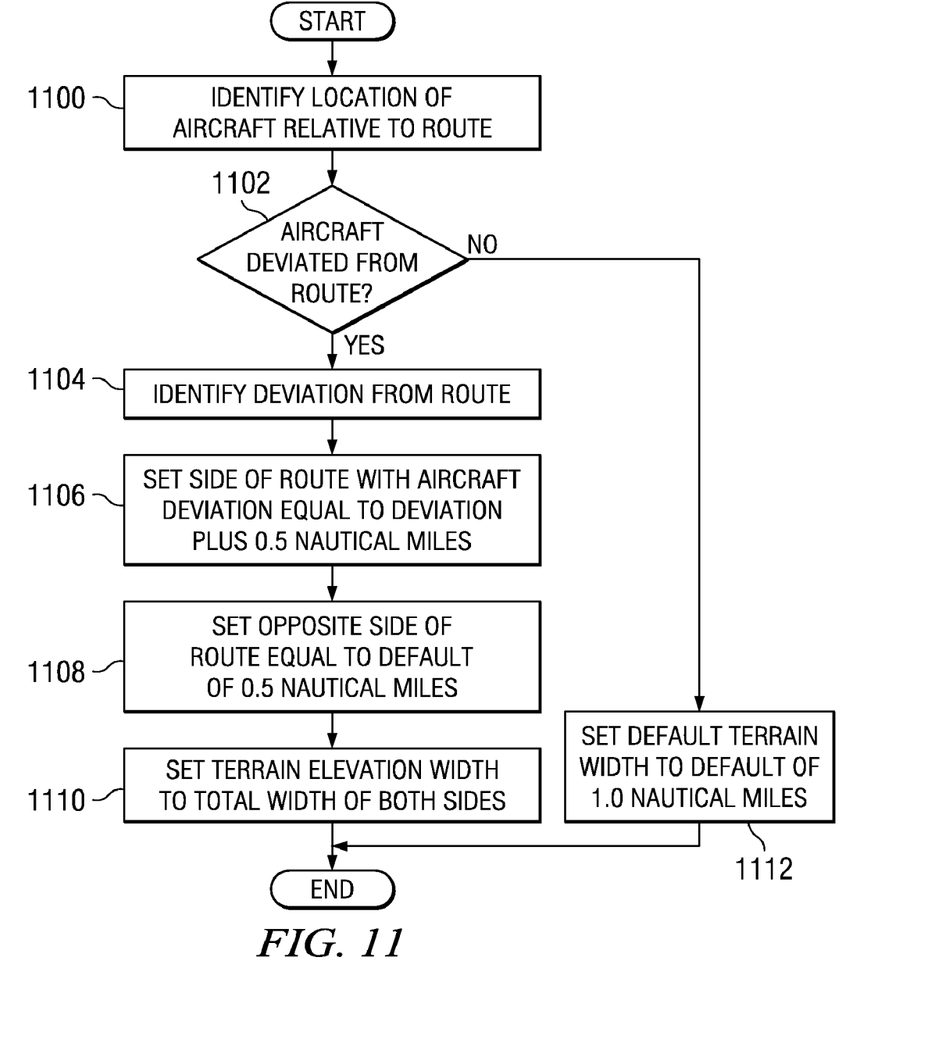
FIG. 11 is a flowchart of a process for identifying an aircraft swath in accordance with an advantageous embodiment.

Turning now to FIG. 11, a flowchart of a process for identifying an aircraft swath is depicted in accordance with an advantageous embodiment. The process illustrated in FIG. 11 is a more detailed description of operation 1000 in FIG. 10.

The process begins by identifying a location of the aircraft relative to the route (operation 1100). In this example, operation 1100 identifies the distance that the aircraft has deviated from the route. This distance is a distance along a line that is perpendicular to the route from the point or the route to the aircraft in these examples. Next, a determination is made as to whether the aircraft has deviated from the route (operation 1102). If the aircraft has deviated from the route, then the deviation from the route is identified (operation 1104).

Thereafter, the side of the route with the aircraft deviation is set equal to the deviation plus 0.5 nautical miles (operation 1106). The process then sets the opposite side of the route equal to a default of 0.5 nautical miles (operation 1108). The terrain elevation width is set equal to the total width of both sides (operation 1110). The process terminates thereafter.

With reference again to operation 1102, if the aircraft has not deviated from the route, then the terrain elevation width is set to a default of one nautical mile (operation 1112). In this situation, a width of 0.5 nautical miles is present on each side of the route. The process then terminates.

In the illustrated example in FIG. 11, the terrain width is dynamically adjusted based on the location of the aircraft relative to the route with respect to how far the aircraft has deviated from the route. As the aircraft deviates farther from the route, the terrain elevation width increases. In these examples, the increase in the swath width is based on the deviation of the aircraft from the route plus an addition of 0.5 nautical miles with the width on the other side of the route being set equal to 0.5 nautical miles.

This setting for the terrain elevation width is only presented for purposes of illustrating one manner in which the terrain elevation width may be identified. Other defaults or amounts may be used other than 0.5 nautical miles depending on the particular implementation. A default of 2.0 nautical miles may be used and 0.75 nautical miles may be added to the change or deviation from the route.

Figure 12:
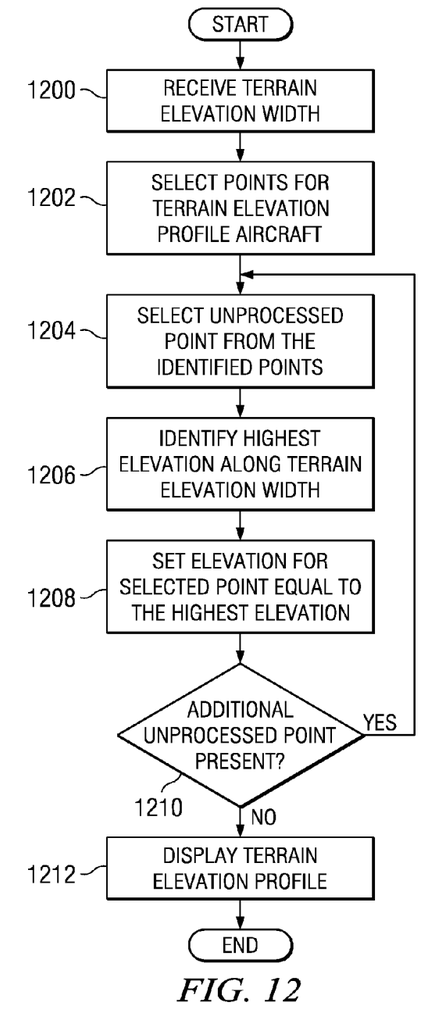
FIG. 12 is a flowchart of a process representing a two dimensional terrain elevation profile display in accordance with an advantageous embodiment.

Turning now to FIG. 12, a flowchart of a process representing a two dimensional terrain elevation profile display is depicted in accordance with an advantageous embodiment. The process illustrated in FIG. 12 is a more detailed description of operation 1002 in FIG. 10.

In this example, the process begins by receiving a terrain elevation width (operation 1200). The terrain elevation width in operation 1200 may be received from the process executing in FIG. 11. Thereafter, points for the terrain elevation profile are selected (operation 1202). These points represent the length of the swath. The points may be for a selected distance ahead of the aircraft or may extend all the way to the arrival point of the aircraft. Further, these points also may extend beyond the arrival point of the aircraft depending on the particular implementation.

Next, an unprocessed point in front of the aircraft is selected from the identified points (operation 1204). A highest elevation along a terrain elevation width is identified for the selected point (operation 1206). The elevation for the selected point is set equal to the highest elevation identified (operation 1208).

Then, a determination is made as to whether an additional unprocessed point is present in the identified points (operation 1210). If an additional unprocessed point is present, the process returns to operation 1204 as described above.

If an additional unprocessed point is not present, then the process displays the terrain elevation profile (operation 1212) with the process terminating thereafter.

Figure 13:
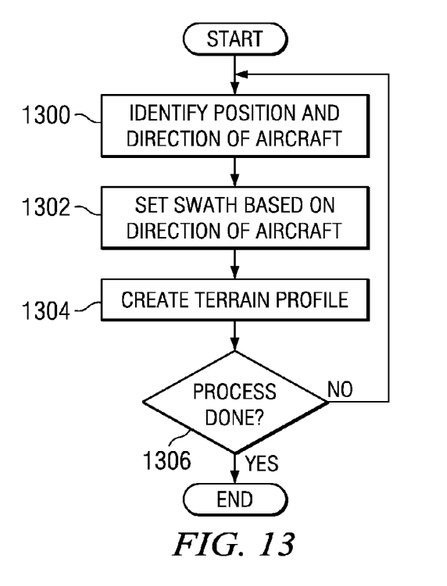
FIG. 13 is a flowchart of a process for presenting two dimensional terrain elevation profile information in accordance with an advantageous embodiment.

Turning now to FIG. 13, a flowchart of a process for presenting two dimensional terrain elevation profile information is depicted in accordance with an advantageous embodiment. The process in FIG. 13 may be executed by a process, such as terrain profile process 206 in FIG. 2. This process is initiated if the process in FIG. 10 terminates in operation 1004 because the aircraft has deviated too far from the route. Further, the process in FIG. 13 also may be initiated if no route is present for the aircraft.

The process begins by identifying the position and direction of the aircraft (operation 1300). Next, a swath is set based on the direction of the aircraft (operation 1302). In these examples, the swath is set using a default value, such as one nautical mile or three nautical miles with the current direction of the aircraft being the center of the terrain elevation width for the swath. In this example, the length of the swath is also set using some default value. For example, the length may be ten nautical miles or fifty nautical miles as an example.

Thereafter, a terrain profile is created (operation 1304). Operation 1304 may be implemented using the process illustrated in FIG. 12. Next, a determination is made as to whether the process is done (operation 1306). The operation may be done if the aircraft lands or if the aircraft deviation from the route is less than some threshold level in these examples.

If the process is done, the process terminates. Otherwise, the process returns to operation 1300 to identify the current position and direction of the aircraft. Any changes in the position and direction of the aircraft may be used to update the swath and update the terrain profile. In this example, the terrain profile may be displayed without the thumbnail depending on the particular implementation. If the process in FIG. 13 terminates because the aircraft is no longer farther than some threshold from the route, the termination of the process causes reinitiation of the process in FIG. 10 in these examples.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Although the depicted embodiments are directed towards providing terrain elevation information to an aircraft, one or more of the different advantageous embodiments may be applied to providing terrain elevation information to other types of vehicles. For example, terrain elevation view information may be provided for surface ships.

Figure 14:
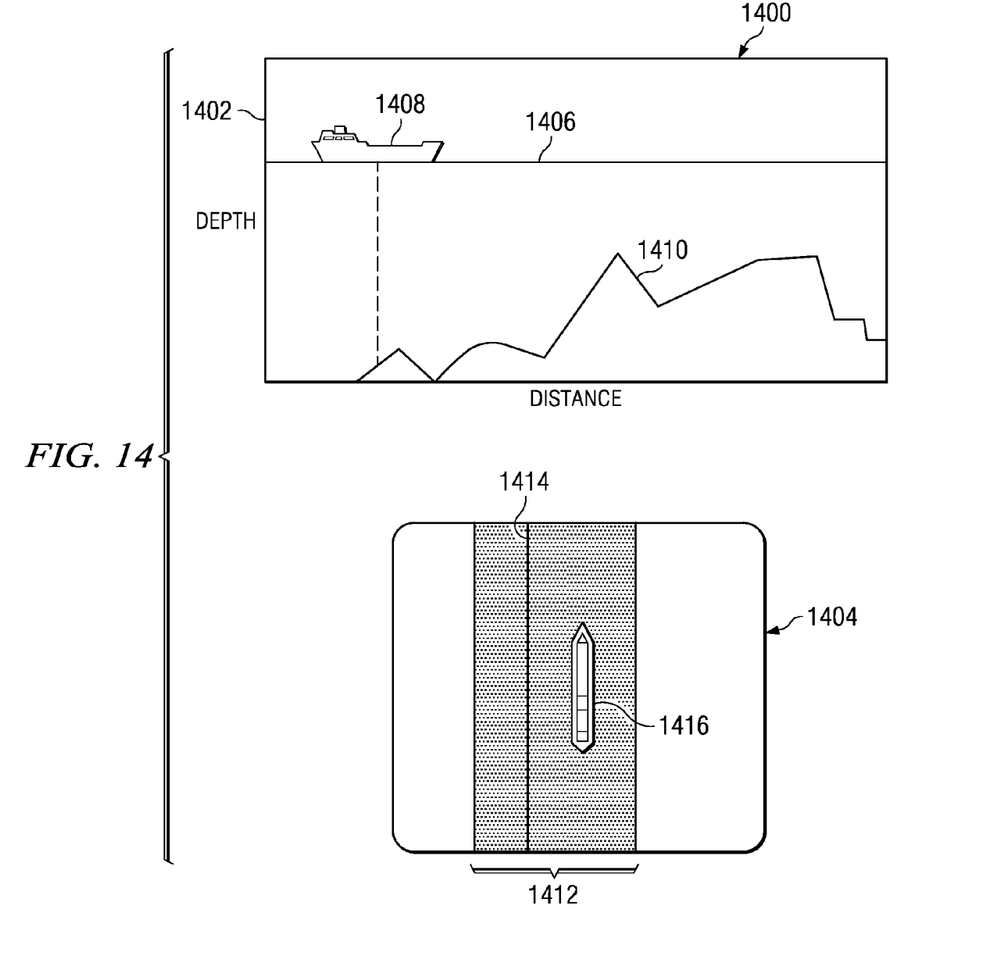
FIG. 14 is a diagram illustrating a terrain elevation profile display containing a terrain elevation view and a thumbnail view for a surface ship in accordance with an advantageous embodiment.

With reference now to FIG. 14 a diagram illustrating a terrain elevation profile display containing a terrain elevation view and a thumbnail view for a surface ship is depicted in accordance with an advantageous embodiment. In this example, display 1400 includes terrain elevation view 1402 and thumbnail view 1404. The X-axis represents the distance in nautical miles, while the Y-axis represents the depth in feet. In this example, terrain elevation view 1402 includes a presentation of route 1406 along with an identification of the location of vessel 1408 along route 1406. Vessel 1408 is displayed in its current position. In this example, terrain elevation 1410 is displayed relative to route 1406 in two dimensions. As can be seen, the different depths of water with respect to the terrain elevation may be identified in terrain elevation view 1402.

Thumbnail view 1404 includes an identification of swath width 1412. Additionally, thumbnail view 1404 presents route 1414 and the location of vessel 1416 relative to route 1414.

The different embodiments can take the form of an entirely hardware embodiment, an entirely software embodiment or an embodiment containing both hardware and software elements. One embodiment may be implemented in software, which includes but is not limited to firmware, resident software, microcode, or other forms.

Furthermore, the different embodiments can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system, or a propagation medium. The medium also may be physical medium or tangible medium on which computer readable program code can be stored. Examples of a computer-readable medium include a semiconductor or solid state memory, magnetic tape, a removable computer diskette, a random access memory (RAM), a read-only memory (ROM), a rigid magnetic disk, an optical disk, or some other physical storage device configured to hold computer readable program code. Current examples of optical disks include compact disk-read only memory (CD-ROM), compact disk-read/write (CD-R/W) and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the data processing system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. For example, although the depicted examples are directed towards aircraft, some or all of the different embodiments may be applied to other types of vehicles. For example, in addition to providing terrain elevation information to a surface vessel, the different embodiments also may be applied to a submarine to display terrain profile views of the ocean floor.

Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for presenting terrain elevation information on a vehicle display, the method comprising:
    identifying a swath representing an area ahead of a vehicle, wherein the swath has a length and a width;
    selecting the width based on a difference between a position of the vehicle and a planned route for the vehicle;
    presenting a two dimensional elevation view on the vehicle display, wherein a vertical axis of the two dimensional elevation view represents a highest elevation along the width of the swath for a particular point along the length of the swath;
    updating the width of the swath in response to vehicle movement to form an updated swath width;
    updating the two dimensional elevation view on the vehicle display using the updated swath width.

2. The method of claim 1, wherein the identifying step comprises:
    identifying the swath representing the area ahead of the vehicle based on a speed of the vehicle when a planned route is absent.

3. The method of claim 1 further comprising:
    displaying a symbol for the vehicle in the two dimensional elevation view at a current position for the vehicle such that an elevation of the vehicle relative to elevations for terrain are identified.

4. The method of claim 1 further comprising:
    presenting a top-down thumbnail view, wherein the top-down thumbnail view includes a planed route and a symbol for the vehicle in which a position of the symbol relative to the planned route indicates deviations by the vehicle from the planned route.

5. The method of claim 1, wherein the presenting step further comprises:
    displaying types of airspace in the two dimensional elevation view.

6. The method of claim 1, wherein the vehicle is one of an aircraft, a surface vessel, or a submarine.

7. A computer program product comprising:
    a computer usable medium having computer readable program code for presenting terrain elevation information, the computer program product comprising:
    computer readable program code for identifying a swath representing an area ahead of a vehicle, wherein the swath has a length and a width;
    computer readable program code selecting the width based on a difference between a position of the vehicle and a planned route for the vehicle;
    computer readable program code for presenting a two dimensional elevation view on the vehicle display, wherein a vertical axis of the two dimensional elevation view represents a highest elevation along the width of the swath for a particular point along the length of the swath;

computer readable program code for updating the width of the swath in response to vehicle movement to form an updated swath width; and computer readable program code for updating the two dimensional elevation view on the vehicle display using the updated swath width.

8. The computer program product of claim 7, wherein the computer readable program code for identifying the swath representing the area ahead of the vehicle comprises:

computer readable program code for identifying the swath representing the area ahead of the vehicle based on a speed of the vehicle when a planned route is absent.

9. The computer program product of claim 7 further comprising:

computer readable program code for displaying a symbol for the vehicle in the two dimensional elevation view at a current position for the vehicle such that an elevation of a vehicle display relative to elevations for terrain are identified.

10. The computer program product of claim 7 further comprising:

computer readable program code for presenting a top-down thumbnail view, wherein the top-down thumbnail view includes a planned route and a symbol for the vehicle in which a position of the symbol relative to the planned route indicates deviations by the vehicle from the planned route.

11. The computer program product of claim 7, wherein the computer readable program code for presenting the two dimensional elevation view on the vehicle display further comprises:

computer readable program code for displaying types of airspace in the two dimensional elevation view.

12. An apparatus comprising:

a bus;

a communications unit connected to the bus;

a storage device connected to the bus, wherein the storage device includes computer readable program code; and a processor unit connected to the bus, wherein the processor unit executes the computer usable program to identify a swath representing an area ahead of a vehicle, wherein the swath has a length and a width; select the width based on a difference between a position of the vehicle and a planned route for the vehicle; present a two dimensional elevation view on a vehicle display, wherein a vertical axis of the two dimensional elevation view represents a highest elevation along the width of the swath for a particular point along the length of the swath; update the width of the swath in response to vehicle movement to form an updated swath width; and update the two dimensional elevation view on the vehicle display using the updated swath width.

13. The apparatus of claim 12, wherein in executing the computer readable program code to identify the swath representing the area ahead of the vehicle, the processor unit executes the computer readable program code to identify the swath representing the area ahead of the vehicle based on a speed of the vehicle when a planned route is absent.

14. The apparatus of claim 12, wherein the processor unit further executes the computer readable program code to display the symbol for the vehicle in the two dimensional elevation view at a current position for the vehicle such that an elevation of the vehicle relative to elevations for terrain are identified.

15. The apparatus of claim 12 wherein the processor unit further executes the computer readable program code to present the top-down thumbnail view, wherein the top-down thumbnail view includes a planned route and a symbol for the vehicle in which a position of the symbol relative to the planned route indicates deviations by the vehicle from the planned route.

16. The apparatus of claim 12, wherein in executing the computer readable program code to present the two dimensional elevation view on the vehicle display, the processor unit executes the computer readable program code to display types of airspace in the two dimensional elevation view.

17. The apparatus of claim 12, wherein the vehicle is one of an aircraft, a surface vessel, or a submarine.

\* \* \* \* \*